United States Patent [19]

Suzuki et al.

[11] 4,256,789

[45] Mar. 17, 1981

[54] INJECTION MOLDED, POLYETHYLENE TEREPHTHALATE PARISON FOR BLOW MOLDING

[75] Inventors: Sadao Suzuki; Masao Akutsu, both of Tokyo; Akiho Ota, Funabashi, all of Japan

[73] Assignee: Yoshino Kogyosho Co., Ltd., Tokyo, Japan

[21] Appl. No.: 58,748

[22] Filed: Jul. 19, 1979

[51] Int. Cl.³ .......................... B32B 1/02; B32B 27/36
[52] U.S. Cl. ...................................... 428/35; 264/537; 425/533
[58] Field of Search ........... 428/35; 264/537, DIG. 1; 425/522, 533; 215/1 C

[56] References Cited

U.S. PATENT DOCUMENTS

| | | | |
|---|---|---|---|
| 3,543,340 | 12/1970 | Guelph | 425/533 |
| 3,733,309 | 5/1973 | Wyeth et al. | 428/35 |

FOREIGN PATENT DOCUMENTS 1192475  4/1959  France ..................................... 264/537

*Primary Examiner*—Paul J. Thibodeau
*Attorney, Agent, or Firm*—Fidelman, Wolffe & Waldron

[57] ABSTRACT

A polymer parison to be blow molded into a container configuration including a reduced diameter neck and a taper wall disposed between the neck and a greater diameter body portion of the container, which is shaped to permit a sufficient amount of stretch to be imparted to the taper wall forming portion of the parison which has a less-stretching tendency during the blow molding operation. Polyethylene terephthalate exhibits greatly improved characteristics and enhanced durability when it is biaxially stretched more than a certain fixed level. The parison is formed by injection molding such that when the parison is placed in the mold cavity, the taper wall forming portion is at an increased spaced distance away from the cavity wall so as to achieve a sufficient amount of stretch, as noted in the body forming portion of the parison, when it is blown to assume the contour of the mold.

2 Claims, 1 Drawing Figure

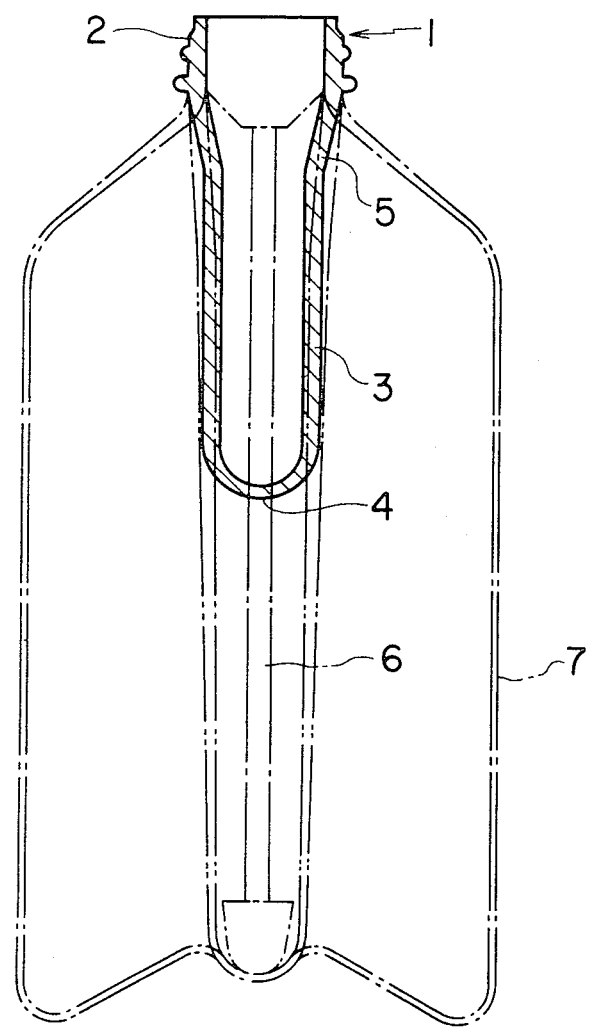

INJECTION MOLDED, POLYETHYLENE TEREPHTHALATE PARISON FOR BLOW MOLDING

This invention relates to injection molded parisons of polyethylene terephthalate to be blow molded into hollow containers with reduced diameter neck portion.

Most of the highly desirable characteristics of polyethylene terephthalate, such as transparency, surface gloss, gas-imperviousness to the ingress of oxygen or carbon dioxide, freedom from included plasticizer, stabilizer or other harmful additives, consequent safety from the sanitary point of view, chemical resistance, sweet-smell keeping ability, and no harmful gas and less heat generated when fired, are realized or enhanced when the polymer is biaxially stretched during the final shaping. Therefore, injection blow molding techniques are used for forming shaped objects from polyethylene terephthalate in many cases.

A typical injection blow molding process includes injection molding a closed bottom parison, reheating the parison to a blow molding temperature, placing the reheated parison in a blow mold, lengthwise stretching the parison in the mold by a pin stretcher, and introducing a pressurized fluid into the parison to expand the same simultaneously with or after the pin stretching.

Referring to the drawing, during the biaxial stretching operation, the expanding portion (1) of the parison tends to be stretched non-uniformly because the container configuration desired. Such non-uniformity in expansion would cause a serious problem if any portion of the parison, after the blow molding, were to remain insufficiently stretched to produce the above mentioned advantageous features of polyethylene terephthalate.

In this viewpoint, the entire wall of a polyethylene terephthalate parison should be stretched more than a certain fixed level, uniformly or non-uniformly, to impart the desired improved properties to the complete shaped object.

Injection blow molded containers as a final product of polyethylene terephthalate are usually of bottle-like configuration including an expanded body and a taper wall portion disposed between the body and the neck. The body forming portion (3) of the parison as a primary product is subjected to the greatest biaxial stretching action during the blowing operation, which always insures the improved properties to the molded polymer.

However, the taper wall portion between the neck and the body tends to be less-stretched than the body-forming portion (3), leading to insufficient stretch and consequent poor gloss or transparency. The area of such poor gloss or poor transparency greatly impairs the external appearance of the bottle (7) as a final product. Therefore, there exists a continuous need for an improved method which enables the taper wall portion of a polyethylene terephthalate parison to be stretched sufficiently to provide the desired improved characteristics.

The present invention is directed toward the objective of overcoming the above-mentioned problem and providing an improved shape of polyethylene terephthalate parison which is formed by injection molding, with a taper wall forming portion shaped to facilitate greater stretching action on the particular wall portion during the blowing operation.

It is a primary object of the present invention to provide a polyethylene terephthalate parison to be blow-molded into a final bottle-like configuration, which includes a taper wall forming portion shaped to permit increased expansion during the blow molding process.

Another object of the present invention is to provide a parison shaped to impart such increased stretch to a selective portion thereof without requiring any additional operation step.

Other objects and advantages of the present invention will become apparent from the following description taken in conjuction with the accompanying drawing, wherein:

The single FIGURE illustrates the configuration of a parison as a primary product according to the invention, also showing the same in axially stretched position by double-chain lines, and showing a bottle as a final product in biaxially stretched position by single-chain lines.

Referring on the drawing, an injection-molded parison (1) as a primary product of the final product (7) according to the present invention comprises a bottle neck-forming portion (2) formed with screw threads or similar projections on the outer surface thereof and adapted to be clamped by a portion of a blow mold when the parison is placed in the mold cavity, a cylindrical body portion (3) having a semispherical shaped, closed bottom (4), and an intermediate taper wall portion (5) disposed between the neck and body forming portions (2) and (3).

The intermediate portion (5) forming a shoulder portion of a bottle (7) as a final product is tapered, providing its greatest diameter at the end adjacent the neck-forming portion (2), and its smallest diameter at the opposite end which corresponds to the diameter of the cylindrical body portion (3). The inner and outer diameters of the neck portion (2) are larger than those of the body portion (3).

The inverted taper wall configuration of the intermediate portion (5) permits the corresponding portion to be stretched more than noted in the body portion (3) when the parison is lengthwise stretched by the pin stretcher (6). In more detail, the inclination of the taper wall (5) with respect to the axis of pin stretching necessitates some lateral outward movement of the taper wall which requires greater stretching stress than that imparted to the uni-directionally stretched, straight cylindrical body portion (3).

Following or simultaneously with the pin stretching, a pressurized fluid is introduced into the parison (1). Again in the blowing step, the intermediate portion (5), which is still in reduced taper configuration, is subjected to a greater expansion in diameter than noted with a prior art parison having a straight cylindrical configuration along the entire axial length thereof except at the neck portion.

It is understood that the juncture area of the intermediate portion (5) with the neck portion (2) and the body portion (3) may be curved to form smooth continuation.

The wall thickness of the intermediate portion (5) may be equal to or different from that of the body portion (3). However, when the taper angle is substantially small, as in the case of bottles having comparatively small difference between the diameter of the neck and that of the body, the intermediate portion (5) may be of reduced wall thickness compared to that of the remainder parison portion, in order to facilitate stretching.

It is also noted that a conventional blow molding machine and operation may be used for the molding of the parison according to the invention, without any special device or operation related to the improved configuration of the parison.

The tapered configuration of the intermediate portion (5) does not cause any problem in injection molding of the parison itself, because the parison is readily released from the core without encountering any obstruction after the injection molding.

From the foregoing, it is understood that the parison as a primary product according to the invention assures sufficient stretch in the intermediate portion (5) between the neck and body forming sections (2) and (3) when the parison is blow molded, to produce the desired improved characteristics of polyethylene terephthalate in the corresponding area of the final product (7), using a conventional or standard blow molding method and apparatus.

What is claimed is:

1. An injection molded parison (1) of polyethylene terephthalate comprising a neck-forming portion (2) adapted to be clamped by a portion of a blow mold when the parison is placed in the mold, a cylindrical body-forming portion (3) having a semispherical shaped, closed bottom (4), and an intermediate taper wall portion (5) having the greatest internal and external diameter at the end connected to said neck-forming portion (2), and the smallest internal and external diameter at the end connected to said body forming portion (3).

2. The injection molded parison of claim 1, wherein the intermediate taper wall portion has a constant angle of taper.

* * * * *

REEXAMINATION CERTIFICATE (1436th)

United States Patent [19]
Suzuki et al.

[11] B1 4,256,789
[45] Certificate Issued  Mar. 26, 1991

[54] INJECTION MOLDED, POLYETHYLENE TEREPHTHALATE PARISON FOR BLOW MOLDING

[75] Inventors: Sadao Suzuki; Masao Akutsu, both of Tokyo; Akiho Ota, Funabashi, all of Japan

[73] Assignee: Yoshino Kogyosho Co., Ltd., Japan

Reexamination Request:
No. 90/001,960, Mar. 15, 1990

Reexamination Certificate for:
Patent No.: 4,256,789
Issued: Mar. 17, 1981
Appl. No.: 58,748
Filed: Jul. 19, 1979

[51] Int. Cl.$^5$ .............................................. B29C 49/00
[52] U.S. Cl. .............................. 428/36.92; 264/537; 425/533; 428/542.8
[58] Field of Search ..................... 428/542.8, 35.7; 264/537, 328.1, DIG. 1, DIG. 33

[56] References Cited

U.S. PATENT DOCUMENTS

| | | | |
|---|---|---|---|
| 3,116,516 | 1/1964 | Moslo | 18/5 |
| 3,347,965 | 10/1967 | Valyi | 264/97 |
| 3,358,062 | 12/1967 | Lemelson | 264/96 |
| 3,426,102 | 2/1969 | Solak et al. | 260/879 |
| 3,470,282 | 9/1969 | Scalora | 264/97 |
| 3,543,340 | 12/1970 | Guelph | 425/525 |
| 3,599,280 | 8/1971 | Rosenkraux et al. | 18/5 BM |
| 3,733,309 | 5/1973 | Wyeth et al. | 260/75 T |
| 3,737,494 | 6/1973 | Wolf | 264/89 |
| 3,882,213 | 5/1975 | Uhlig | 264/97 |
| 3,934,743 | 1/1976 | McChesney et al. | 428/156 |
| 3,949,038 | 4/1976 | McChesney et al. | |
| 3,956,441 | 5/1976 | Uhlig | 264/89 |
| 3,984,498 | 10/1976 | McChesney et al. | 264/97 |
| 3,989,784 | 11/1976 | Uhlig | 264/89 |
| 4,025,594 | 5/1977 | Agrawal | 264/97 |
| 4,044,086 | 8/1977 | McChesney et al. | 264/97 |
| 4,054,629 | 10/1977 | Wang et al. | 264/97 |
| 4,071,532 | 1/1978 | Rose | 264/97 |
| 4,098,857 | 7/1978 | Farrell | 264/89 |
| 4,147,748 | 4/1979 | Saumsiegle | 264/523 |

FOREIGN PATENT DOCUMENTS

| | | |
|---|---|---|
| 1192475 | 10/1959 | France |
| 50-15031 | 6/1975 | Japan |
| 51-77661 | 7/1976 | Japan |

*Primary Examiner*—Paul J. Thibodeau
*Attorney, Agent, or Firm*—James A. Oliff; William P. Berridge

[57] ABSTRACT

A polymer parison to be blow molded into a container configuration including a reduced diameter neck and a taper wall disposed between the neck and a greater diameter body portion of the container, which is shaped to permit a sufficient amount of stretch to be imparted to the taper wall forming portion of the parison which has a less-stretching tendency during the blow molding operation. Polyethylene terephthalate exhibits greatly improved characteristics and enhanced durability when it is biaxially stretched more than a certain fixed level. The parison is formed by injection molding such that when the parison is placed in the mold cavity, the taper wall forming portion is at an increased spaced distance away from the cavity wall so as to achieve a sufficient amount of stretch, as noted in the body forming portion of the parison, when it is blown to assume the contour of the mold.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *